US005987437A

United States Patent [19]
Franklin

[11] Patent Number: 5,987,437
[45] Date of Patent: Nov. 16, 1999

[54] METHOD OF IMPROVING ASSISTANCE TO AN OPERATOR TO BALANCE AN OUT-OF-PROOF TRANSACTION AND AN APPARATUS THEREFOR

[75] Inventor: Lianne C. Franklin, Waterloo, Canada

[73] Assignee: NCR Corporation, Dayton, Ohio

[21] Appl. No.: 08/717,964

[22] Filed: Sep. 23, 1996

[51] Int. Cl.⁶ .............................. G06F 15/30; G06K 9/00
[52] U.S. Cl. .................. 705/39; 705/30; 705/33; 705/45; 235/379; 235/470; 708/406
[58] Field of Search ............ 705/30, 39; 235/379, 235/470

[56] References Cited

U.S. PATENT DOCUMENTS

| | | | |
|---|---|---|---|
| 4,953,085 | 8/1990 | Atkins | 705/36 |
| 5,040,227 | 8/1991 | Lyke et al. | 382/7 |
| 5,093,787 | 3/1992 | Simmons | 364/406 |
| 5,120,944 | 6/1992 | Kern et al. | 235/379 |
| 5,151,948 | 9/1992 | Lyke et al. | 382/7 |
| 5,182,706 | 6/1993 | Cunningham et al. | 354/406 |
| 5,212,639 | 5/1993 | Sampson et al. | 705/30 |
| 5,221,830 | 6/1993 | Kern | 235/379 |
| 5,224,204 | 6/1993 | Tsuruta et al. | 706/46 |
| 5,225,978 | 7/1993 | Petersen et al. | 705/33 |
| 5,237,158 | 8/1993 | Kern et al. | 235/379 |
| 5,349,170 | 9/1998 | Kern | 235/379 |
| 5,433,483 | 7/1995 | Yu | 283/58 |
| 5,488,671 | 6/1998 | Kern | 382/138 |
| 5,815,717 | 8/1998 | Stack | 395/705 |
| 5,826,245 | 10/1998 | Sandberg-Dimet. | 795/44 |
| 5,832,463 | 11/1998 | Funk | 705/35 |

OTHER PUBLICATIONS

Girto, J.J., Soricon, Inc., Company Report >PG 1–4, Investtext, Dialog File 05242380/9,1 p.

Britt, Phil, The many facets of check imaging, Savings and Community Banker, v3, n10, pp.35–40.

*Primary Examiner*—Allen R. MacDonald
*Assistant Examiner*—Pedro R. Kanof
*Attorney, Agent, or Firm*—Michael Chan

[57] ABSTRACT

Improved assistance is provided to an operator to balance an out-of-proof transaction at a balancing workstation of an image-based financial document processing system used to process transaction items including debit and credit items. A number of suspect tests are invoked. The suspect tests have been previously arranged in an order which is based upon at least one characteristic data collected over a previous time period. The invoked suspect tests are applied to the debit items and the credit items in the particular order to improve assistance to the operator to balance the out-of-proof transaction.

19 Claims, 10 Drawing Sheets

FIG. 4

| COLUMN 1 | COLUMN 2 | COLUMN 3 | COLUMN 4 | COLUMN 5 |
|---|---|---|---|---|
| TRANSACTION ITEM NUMBER | FINAL AMOUNTS | ORIGINAL AMOUNTS | SUSPECT? | CORRECT SUSPECT? |
| 1 | 206.37 CR | 206.37 CR | | |
| 2 | 1.32 DR | 1.23 DR | <= (1.32) | YES |
| 3 | 4.56 DR | 4.56 DR | <= (4.65) | NO |
| 4 | 20.10 DR | 20.10 DR | | |
| 5 | 179.16 DR | 179.16 DR | | |
| 6 | 1.23 DR | 1.23 DR | <= (1.32) | NO |

FIG. 5

| COLUMN 1 | COLUMN 2 | COLUMN 3 | COLUMN 4 | COLUMN 5 |
|---|---|---|---|---|
| TRANSACTION ITEM NUMBER | FINAL AMOUNTS | ORIGINAL AMOUNTS | SUSPECT? | CORRECT SUSPECT? |
| 1 | 363.24 CR | 363.24 CR | | |
| 2 | 4.59 DR | 4.59 DR | | |
| 3 | 15.95 DR | 15.95 DR | <= (1.55) | NO |
| 4 | 71.55 DR | 71.55 DR | | |
| 5 | 1.59 DR | 15.99 DR | <= (1.59) | YES |
| 6 | 67.00 DR | 67.00 DR | | |
| 7 | 123.00 DR | 123.00 DR | | |
| 8 | 79.56 DR | 79.56 DR | | |

FIG. 6

| COLUMN 1 | COLUMN 2 | COLUMN 3 | COLUMN 4 | COLUMN 5 |
|---|---|---|---|---|
| TRANSACTION ITEM NUMBER | FINAL AMOUNTS | ORIGINAL AMOUNTS | SUSPECT? | CORRECT SUSPECT? |
| 1 | 137.06 CR | 137.06 CR | | |
| 2 | 1.23 DR | 1.23 DR | <= (1.26) | NO |
| 3 | 4.56 DR | 4.56 DR | <= (4.59) | NO |
| 4 | 7.89 DR | 7.89 DR | | |
| 5 | 10.00 DR | 10.00 DR | <= (10.03) | NO |
| 6 | 0.59 DR | 0.56 DR | <= (0.59) | YES |
| 7 | 17.67 DR | 17.67 DR | | |
| 8 | 79.00 DR | 79.00 DR | <= (79.03) | NO |
| 9 | 1.17 DR | 1.17 DR | | |
| 10 | 14.95 DR | 14.95 DR | <= (14.98) | NO |

FIG. 7

| | COLUMN 1 | COLUMN 2 | COLUMN 3 |
|---|---|---|---|
| | TRANSPOSED DIGITS TEST | EXTRA DIGIT TEST | WRONG DIGIT TEST |
| CORRECT SUSPECTS | 10000 | 10000 | 10000 |
| INCORRECT SUSPECTS | 20000 | 10000 | 50000 |
| % CORRECT SUSPECTS | 1% | 1% | 1% |
| % INCORRECT SUSPECTS | 2% | 1% | 5% |
| | | | |
| PERCENTAGE RATIO %CORRECT:%INCORRECT | 1:2 | 1:1 | 1:5 |
| SCORE | 50 | 100 | 0 |
| RELATIVE PRIORITY | 2 | 1 | 0 (DON'T DO) |

FIG. 8

| SUSPECT TEST: | COLUMN 1<br>TRANSPOSED<br>DIGITS TEST | | COLUMN 2<br>EXTRA<br>DIGIT TEST | | COLUMN 3<br>WRONG<br>DIGIT TEST | |
|---|---|---|---|---|---|---|
| OPERATOR | JANE | JOHN | JANE | JOHN | JANE | JOHN |
| CORRECT SUSPECTS | 9000 | 1000 | 1000 | 9000 | 5000 | 5000 |
| INCORRECT SUSPECTS | 10000 | 10000 | 5000 | 5000 | 25000 | 25000 |
| % CORRECT SUSPECTS | 1.8% | 0.2% | 0.2% | 1.8% | 1% | 1% |
| % INCORRECT SUSPECTS | 2% | 2% | 1% | 1% | 5% | 5% |
| PERCENTAGE RATIO<br>%CORRECT:%INCORRECT | 1:8:2 | 0:2:2 | 0:2:1 | 1:8:1 | 1:5 | 1:5 |
| SCORE | 100 | 10 | 20 | 200 | 0 | 0 |
| RELATIVE PRIORITY | 1 | 2 | 2 | 1 | 0 (DON'T DO) | 0 (DON'T DO) |

METHOD OF IMPROVING ASSISTANCE TO AN OPERATOR TO BALANCE AN OUT-OF-PROOF TRANSACTION AND AN APPARATUS THEREFOR

BACKGROUND OF THE INVENTION

The present invention relates to balancing an out-of-proof transaction which includes a number of debit items and a number of credit items at a balancing workstation of an image-based check processing system, and is particularly directed to improving assistance to an operator to balance the out-of-proof transaction at the balancing workstation.

A typical image-based check processing system includes a number of balancing workstations at which out-of-proof transactions are balanced. Each transaction includes a number of debit items and a number of credit items. The total amount of the debit items is intended to equal the total amount of the credit items. When the total amounts are not equal, a particular transaction does not balance and an out-of-proof transaction exists.

To balance an out-of-proof transaction, a transaction item (debit item or credit item) causing the out-of-proof condition must be identified and then corrected. A known way of balancing the out-of-proof transaction is to apply a number of suspect tests to transaction items until the out-of-proof condition is identified and corrected. Typically, each suspect test is implemented via software and is invoked when the operator at one of the balancing workstations presses a "SUSPECT" key on a keyboard at the balancing workstation.

When a suspect test is invoked, a number of suspect transaction items is selected and presented on a display screen to the operator. The actual suspect transaction items selected and presented on the display screen to the operator depend upon the particular suspect test which has been invoked by the software. The operator then evaluates each suspect transaction item as it is presented on the display screen, and either verifies the solution to the out-of-proof problem or presses the "SUSPECT" key again to invoke another suspect test. The out-of-proof problem is solved when the correct solution is found.

The order in which the suspect tests are applied, and whether or not each suspect test is applied, usually affects the average time to solve the out-of-proof problem. It is desirable to apply suspect tests in an order which maximizes throughput of the check processing system.

A known method of prioritizing suspect tests is for the manufacturer of the check processing system to collect data from a customer, analyze this collected data, and then prioritize suspect tests in accordance with the results of this analysis. Each check processing system would have the same prioritization of suspect tests. A disadvantage in using this method is that a different customer will usually have a different prioritization of suspect tests because of different factors affecting the typical types of out-of-proof problems to be solved for that particular customer.

Another known method of prioritizing suspect tests is to provide a check processing system which allows each customer to define the order in which the suspect tests are prioritized. A disadvantage in using this method is that each customer must be studied and customized to produce optimal results. Another disadvantage is that typical out-of-proof problems may change over time and, therefore, may affect the prioritization of suspect tests.

In known check processing systems, the process of identifying and correcting a transaction item causing the out-of-proof condition may be relatively time-consuming. The process is especially relatively time consuming when there is a large number of transaction items in each transaction. When this occurs, the cost of operating the check processing system is usually relatively high.

SUMMARY OF THE INVENTION

In accordance with one aspect of the present invention, a method of improving assistance to an operator to balance an out-of-proof transaction at a balancing workstation of an image-based financial document processing system used to process transaction items including debit and credit items, comprises the steps of (a) invoking a number of suspect tests which have been previously arranged in an order which is based upon at least one characteristic data collected over a previous time period, and (b) applying the invoked suspect tests of step (a) to the debit items and the credit items in the order defined in step (a) to improve assistance to the operator to balance the out-of-proof transaction.

The at least one characteristic data is analyzed to determine the number of times that each suspect test would have been correctly applied to transaction items including debit items and credit items keyed in by the particular operator during the previous time period. The at least one characteristic data is analyzed to determine the number of times that each suspect test would have been incorrectly applied to transaction items including debit items and credit items keyed in by the particular operator during the previous time period. The instructions of a program are executed to present the suspect tests in the order which is based upon the at least one characteristic data collected over the previous time period. The invoked suspect tests are applied to the debit items and the credit items in the order defined in step (a) until the operator balances the out-of-proof transaction.

In accordance with another aspect of the present invention, a method of ordering suspect tests to be applied to transaction items including debit items and credit items keyed in by an operator at a balancing workstation of an image-based financial document processing, comprises the steps of (a) collecting data indicative of at least one characteristic data associated with a previous time period, and (b) arranging the suspect tests in an order which is based upon the collected data of step (a). Preferably, a score is computed for each suspect test based upon the collected data of step (a). The suspect tests are then arranged in an order based upon the computed scores of the suspect tests.

In accordance with yet another aspect of the present invention, an apparatus is provided for improving assistance to an operator to balance an out-of-proof transaction at a balancing workstation of an image-based financial document processing system used to process transaction items including debit items and credit items. The apparatus comprises a first memory unit for storing the transaction items currently being processed, a second memory unit for storing the order of a number of suspect tests to be applied to the transaction items stored in the first memory unit, and a third memory unit for storing data indicative of at least one characteristic data over a previous time period. The apparatus further comprises processing means for (i) invoking the suspect tests in the order stored in the second memory unit and (ii) applying the invoked suspect tests to the transaction items stored in the first memory unit based upon the data stored in the third memory unit. The processing means includes means for analyzing the at least one characteristic data to determine the best priority order of the suspect tests and stores the resulting order into the second memory unit.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIGS. 4–6 are examples of representative data at the keying and balancing workstation of FIG. 2;

FIGS. 7 and 8 are tables containing numbers calculated in accordance with the present invention.

DETAILS OF THE INVENTION

Figure 1:
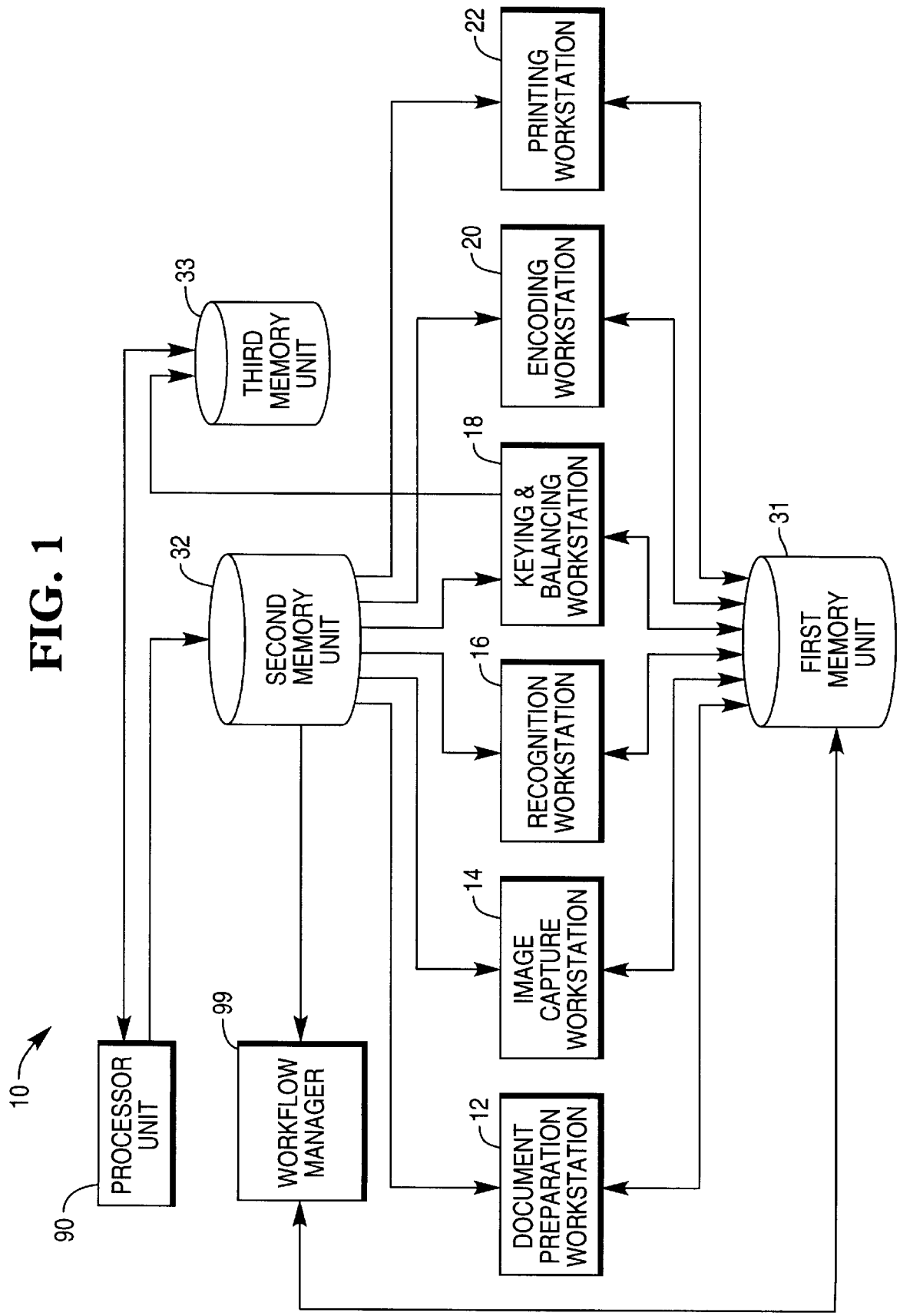
FIG. 1 is a schematic block representation of an image-based check processing system embodying the present invention.

The present invention is directed to a method of improving assistance to an operator at a balancing workstation of an item processing system to balance an out-of-proof transaction. The specific use of the method described in the present application may vary. By way of example, an item processing system in the form of an image-based check processing system 10 embodying the present invention is illustrated in FIG. 1. The image-based check processing system 10 comprises different types of workstations including a document preparation workstation 12, an image capture workstation 14, a recognition workstation 16, a keying and balancing workstation 18, an encoding workstation 20, and a printing workstation 22. Each of the workstations 12, 14 creates units of work and submits the created work to a workflow manager 99 in a known way. Each of the workstations 16, 18, 20, 22 polls the workflow manager 99 in a known manner for work to perform, and may also create units of work which is submitted back to the workflow manager 99.

At the document preparation workstation 12, transaction items including a number of debit items and a number of credit items associated with each transaction are prepared for further processing. Preparation of the debit and credit items may include removal of paper clips, staples, and the like, and stacking of the items in a particular order and/or direction in suitable trays. The trays containing the stacked items are then manually carted to the image capture workstation 14.

At the image capture workstation 14, the stacked items in the trays are manually removed from the trays and placed onto an image lift transport (not shown) of the image capture workstation 14. The transaction items on the image lift transport are moved along a path in front of a front image lift camera and in front of a rear image lift camera (both not shown). The image lift camera optically scans each item as the item moves along the path in front of the cameras to produce front and rear electronic images of the item. The electronic images of the item are then stored in a first memory unit 31. An image database containing electronic images of the transaction items including the debit items and the credit items is thereby created and stored in the first memory unit 31. Also, if the item being processed contains a MICR codeline, the MICR codelines is read as the item passes by a MICR reader (not shown). The MICR codeline is associated with the front and rear electronic images and then stored in the image database in the first memory unit 31.

After the electronic images of an item are lifted by the image lift cameras and the images and MICR codeline are captured, the item is then sorted into an appropriate sorter pocket (not shown) of the image capture workstation 14. Preferably, the image capture workstation 14 includes the Model 7780 Item Processing System, manufactured by NCR Corporation, located in Dayton, Ohio. The sorted items in each of the sorter pockets are then stacked in a respective tray. The trays are then manually carted to the encoder workstation 20. The trays of items await at the encoder workstation 20 until the electronic images and the MICR codelines of the items which were earlier captured and stored in the first memory unit 31 at the image capture workstation 14 are processed by the recognition workstation 16 and the keying and balancing workstation 18 in the manner described hereinbelow.

At the recognition workstation 16, the electronic images of the items stored in the image database in the first memory unit 31 after being processed at the image capture workstation 14 are processed using known recognition techniques to determine the "amount" associated with each item. The amount of each item is then associated with the corresponding electronic images and the MICR codeline of the item and stored in the database in the first memory unit 31. A one-to-one correspondence is thereby established between the electronic images and the MICR codeline of each item and the amount associated with that particular item to provide the image database in the first memory unit 31 as previously described.

It should be noted that some amounts will not be recognizable to the recognition workstation 16. Also, some amounts recognized at the recognition workstation 16 may have a low confidence level associated therewith. These items are identified and then processed further at the keying and balancing workstation 18.

Figure 2:
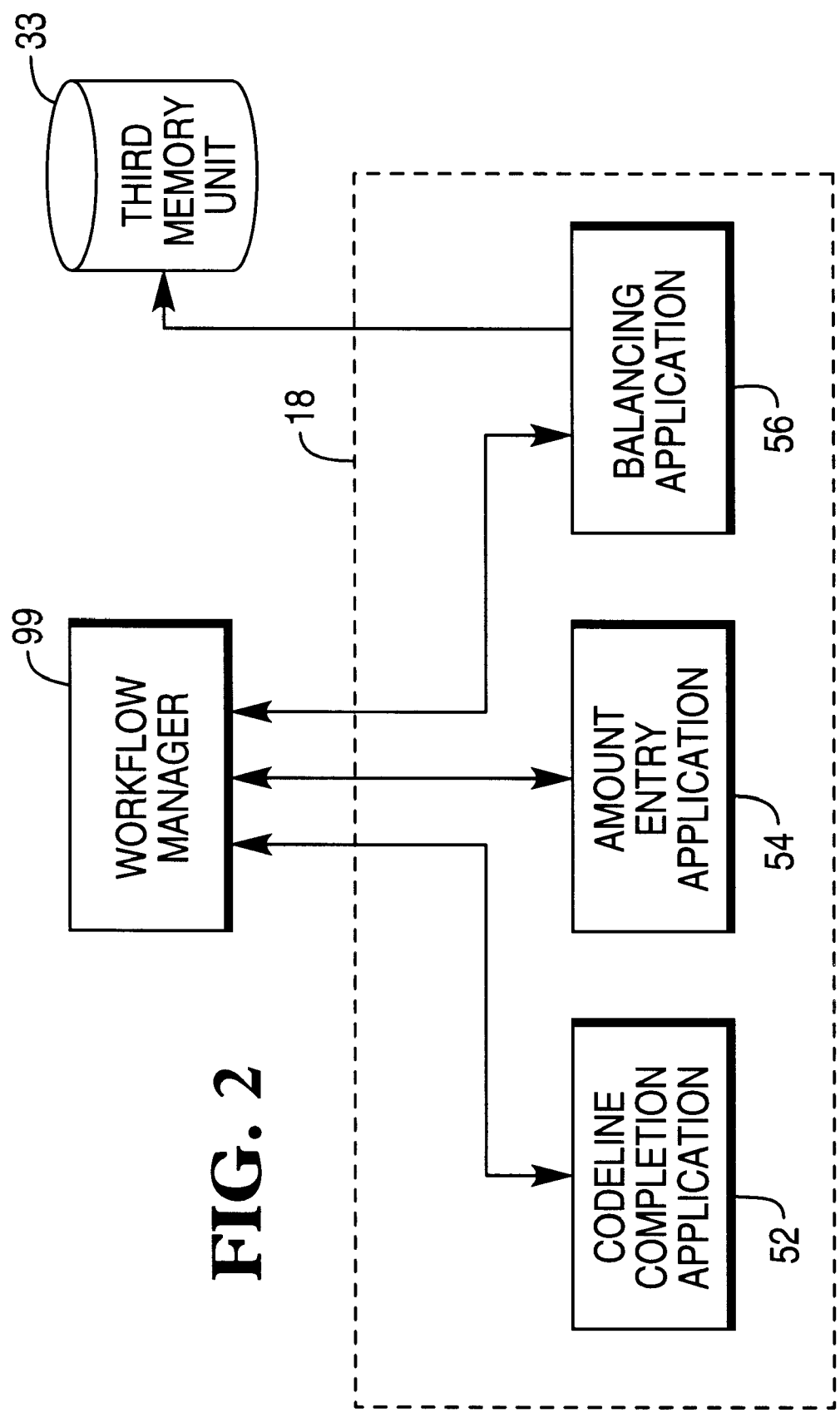
FIG. 2 is an enlarged schematic block representation of a portion of the check processing system of FIG. 1.

As shown in FIG. 2, the keying and balancing workstation 18 comprises a number of applications including a codeline completion application 52, an amount entry application 54, and a balancing application 56. Each of the applications 52, 54, 56 communicates with the workflow manager 99 and receives units of work to process from the workflow manager 99 in response to units of work being completed by the recognition workstation 16. Each of the applications 52, 54, 56 also communicates with a second memory unit 32, and the balancing application 56 communicates with a third memory unit 33. The second memory unit 32 stores data relating to suspect tests to be applied to debit items and credit items of transactions as well as other parameters for the system. The third memory unit 33 stores data indicative of at least one characteristic data over a previous time period. This characteristic data may be associated with habits of a particular operator, as will be described later.

An operator at the keying and balancing workstation 18 has a multiple number of applications from which to select. The operator may select the codeline completion application 52 from an application selection menu (not shown) which enables the operator to manually complete the MICR codeline which identifies the particular transaction document item. More specifically, the workflow manager 99 establishes, in a known way, any items with either missing or rejected MICR-related information. These items are displayed on a display screen of a monitor at the keying and balancing workstation 18. The operator at the keying and balancing workstation 18 completes the codelines of the items identified as having either missing or rejected MICR-related information.

An operator at the keying and balancing workstation 18 may also select the amount entry application 54 from the application selection menu which enables the operator to manually complete the amount of the debit items and the credit items, as the case may be. More specifically, after the MICR codelines of all of the items have completed, the workflow manager 99 establishes, in a known way, any items with either missing, rejected, or low confidence amount information from the recognition workstation 16. These items are displayed on the display screen of the monitor at the keying and balancing workstation 18. The operator at the keying and balancing workstation 18 completes the amount field of the items identified as having missing, rejected, or low confidence amounts.

An operator at the keying and balancing workstation 18 may also select the balancing application 56 from the application selection menu which enables the operator to balance out-of-proof transactions. More specifically, after the amount fields of all of the items have been completed, the workflow manager 99 establishes, in a known way, any batches of items containing transactions which are out-of-proof.

It is contemplated that more than one operator may be dedicated to the function of completing codelines of items at the keying and balancing workstation 18. Also, more than one operator may be dedicated to the function of completing the amount fields of items at the keying and balancing workstation 18. Similarly, more than one operator may be dedicated to the function of balancing batches of items at the keying and balancing workstation 18.

As an example, a typical system may include one codeline operator, four amount keying operators, and two balancing operators. Each balancing operator processes a "batch" of transactions. Typically, a batch of transactions includes a number of different transactions. Each batch of transactions processed by a particular balancing operator is identified with an identifier associated with the particular amount keying operator. This identifier associated with each batch of transactions is used to prioritize suspect tests in accordance with the present invention, and will be described in detail later.

Although the foregoing describes a "batch" containing multiple transactions, it is contemplated that a "block" containing multiple batches may be processed in the same manner. A block or a batch containing multiple transactions may sometimes be referred to as a "unit of work".

Figure 3A:
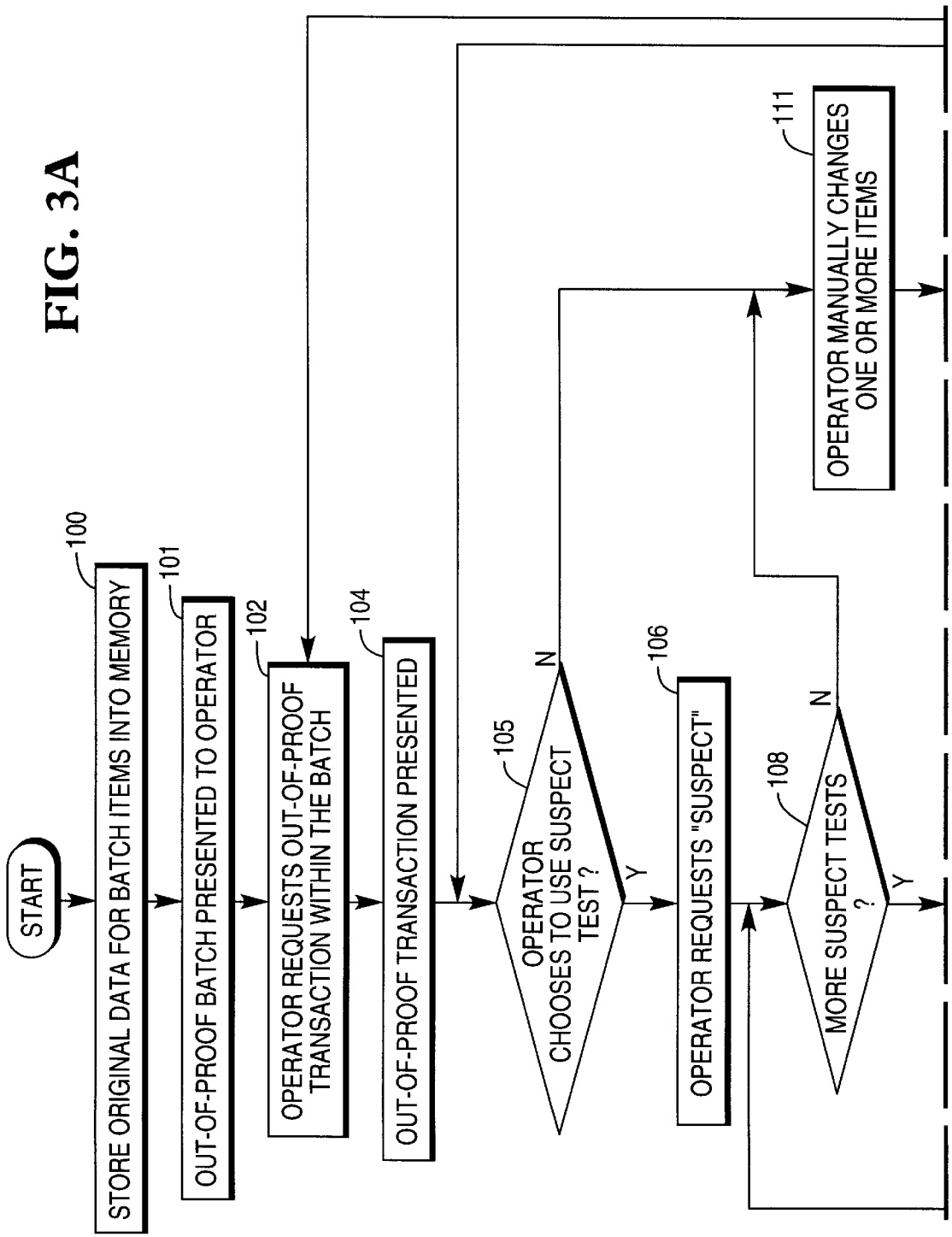
FIG. 3 is a flowchart depicting a process carried out at a keying and balancing workstation of FIG. 2.
Figure 3B:
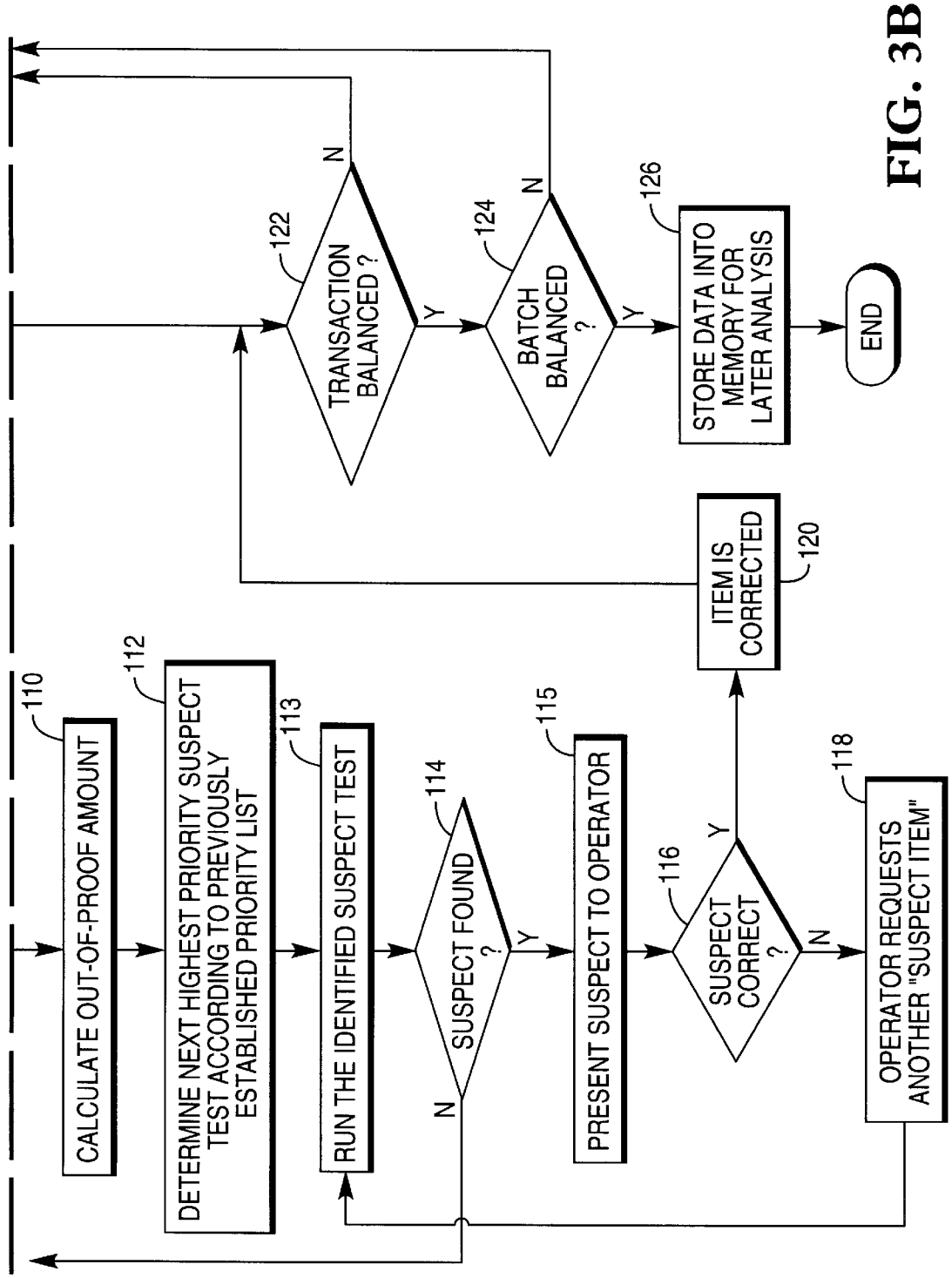

When at least one out-of-proof transaction is determined to exist, the entire batch of transactions is processed further at the keying and balancing workstation 18 as described in detail hereinbelow with reference to FIG. 3. FIG. 3 is a flowchart which depicts the process followed by the operator in balancing the batch which includes at least one out-of-proof transaction. In step 100, the original data for each item in the batch of transaction items is stored into the third memory unit 33 for later analysis. The original data includes data such as original amounts, item types, and adjustment flags for each item in the out-of-proof batch of transactions. In step 101, the batch of transactions containing the at least one out-of-proof transaction is presented to the operator via the display screen of the monitor at the keying and balancing workstation 18. The operator then presses an appropriate key at the keying and balancing workstation 18 to request that an out-of-proof transaction be located, as shown in step 102. In step 104, one unbalanced transaction is displayed to the operator.

A determination is then made in step 105 as to whether the operator has chosen to apply a suspect test. If the determination in step 105 is negative, the process proceeds to set 111 in which the operator can manually correct one or more of the transaction items before proceeding to step 122 which will be described later. If the determination is step 105 is affirmative, the process proceeds to step 106. As shown in step 106, the operator then presses a "SUSPECT" key to invoke a suspect test in an attempt to locate the particular debit item or credit item which is causing the out-of-proof condition or to provide another type of suggestion such as "ADDITION ERROR" or "MISSING CHECK".

A determination is then made in step 108 as to whether there are any more suspect tests to run after the operator has pressed the "SUSPECT" key in step 106. If the determination if step 108 is negative, the process proceeds to step 111 to allow the operator to correct an error before proceeding to step 122 which will be described later. If the determination in step 108 is affirmative, the out-of-proof amount is calculated in step 110 by taking the difference between the total amount of the debit items and the total amount of the credit items in the transaction. The next highest priority suspect test is then identified in step 112 and invoked in step 113 in an attempt to locate the particular debit or credit item which is causing the out-of-proof condition or to provide another type of suggestion such as "ADDITION ERROR" or "MISSING CHECK". The suspect tests are prioritized using a learning algorithm which will be described in detail later.

A determination is then made in step 114 as to whether any suspect item has been identified based upon the suspect test applied in step 113. If the determination in step 114 is negative, the process loops back to step 108. If the determination in step 114 is affirmative, the identified suspect item is displayed to the operator, as shown in step 115. A determination is then made in step 116 as to whether the suspect item identified in step 114 is the one containing the incorrect amount or whether the suggestion such as "MISSING CHECK" is correct. If the determination in step 116 is negative, the operator requests another suspect item to be identified as shown in step 118 and loops back to step 113. The same suspect test is invoked at step 113 to see if the test identifies another suspect item in the out-of-proof transaction. Step 114 is invoked and processing continues as previously described. If the determination in step 116 is affirmative, the debit item or the credit item which is causing the out-of-proof condition in the particular transaction is corrected by the operator as shown in step 120 or the suggestion is implemented (such as inserting the missing check into the transaction).

The process then proceeds to step 122 in which a determination is made as to whether the out-of-proof transaction is now balanced. If the determination in step 122 is negative, the process loops back to step 105 in which the operator may press the "SUSPECT" key again. If the determination in step 122 is affirmative, the process proceeds to step 124 in which a determination is made as to whether the entire batch of transactions is now balanced. If the determination in step 124 is negative, the process loops back to step 102 in which the operator may request that another out-of-proof transaction be identified by pressing the appropriate key at the keying and balancing workstation 18. If the determination in step 124 is affirmative, then the operator has completely balanced the batch and the process proceeds to step 126. In step 126, the final data for each item in the batch of transaction items is stored in the third memory unit 33 for later analysis. The final data includes all data required for after-hours suspect test analysis which will be described later. The final data includes data such as final amounts, item types, and adjustment flags for every item in the balanced batch of transactions. After step 126, the workflow manager 99 takes control and processing begins again at step 100 with another batch containing multiple transactions.

There are a number of different categories of suspect tests which may be invoked. The categories of suspect tests may include: (i) amount suspect tests; (ii) item type suspect tests; (iii) location suspect tests; (iv) piggyback adjustment suspect tests; (v) ghost adjustment suspect tests. Such categories of suspect tests including particular suspect tests are well known in the art and, therefore, will not be described.

Examples of the "amount suspect test" category are described with reference to FIGS. 4–6. The "amount suspect test" category includes a number of different tests including "transposed digits", "missing or extra digit", "wrong digit", etc. The example of FIG. 4 is the "transposed digits test". The example of FIG. 5 is the "extra digit test". The example of FIG. 6 is the "wrong digit test".

In each of FIGS. 4–6, there are five columns (labeled Columns 1–5) in a table. Column 1 contains a reference number to a particular transaction item in the table. Column 2 contains the final amount of each of the transaction items in the table when the transaction is balanced. The darkened item is the one changed by the operator. Column 3 contains the original amount of each of the transaction items in the table before any balancing occurs. Column 4 identifies all of the suspect items and the amount each particular suspect item needs to be changed to in order to balance the transaction. Column 5 is based upon a comparison of column 2 and 3 and contains an indication as to whether the comparison was correct or not to balance the transaction.

The example of FIG. 4 shows a transaction in which the second transaction item is incorrect. According to the transposed digits test, three suspect items (items 2, 3, and 6) are presented to the operator. Only one of the three suspect items is correct, and the other two suspect items are incorrect. The out-of-proof difference between the total amount of the debit items and the total amount of the credit items is $0.09. This may be caused by the digit pair "32" being transposed as "23" in the last two digits in the debit items. Alternatively, this may be caused by the digit pair "65" being transposed as "56" in the last two digits of the debit items. The three suspect items are presented to the operator so that the operator can correct transaction item 2 which balances the transaction. The transaction becomes balanced when the digit transposition error in transaction item 2 is corrected.

The example of FIG. 5 shows a transaction in which transaction item 5 is incorrect. According to the extra digit test, two suspect transaction items are identified and presented to the operator. One of the suspect items is correct and the other is incorrect. The out-of-proof difference is $14.40. This may be caused by an extra "9" in the second-last digit of the debit items. The operator is presented with both suspect items so that the operator can correct suspect transaction item 5 which balances the transaction. The transaction becomes balanced when the extra "9" is removed from the incorrect amount of transaction item 5.

The example of FIG. 6 shows a transaction in which transaction item 6 is incorrect with the wrong digit. According to the wrong digit test, six suspect transaction items are identified and presented to the operator. One of the suspect transaction items is correct and the other five suspect items are incorrect. The out-of-proof difference is −$0.03. Any debit item with a last digit between 0 and 6 is selected and presented to the operator. Since all of the debit items having a last digit between 0 and 6 are selected in this test, a substantial number of suspect transaction items are presented to the operator. Accordingly, the accuracy of this suspect test is usually relatively low. The transaction becomes balanced when the amount of $0.03 is added to the correct suspect transaction item.

In accordance with the present invention, the above-mentioned suspect tests are prioritized in an order using a learning algorithm which is based upon an analysis of certain characteristic data collected over a previous time period. The certain characteristic data is collected in steps 100 and 126, as shown in FIG. 3. The characteristic data may, for example, be associated with the number of transaction items keyed in by a particular amount entry operator over a previous time period. By way of example, characteristic data from the above three examples of suspect tests (i.e., the transposed digits test, the extra digit test, and the wrong digit test) is analyzed, as shown in FIG. 7.

It should be noted that the percentage ratio of correct to incorrect for the example transposed digits test of FIG. 4 is 1:2. The percentage ratio of correct to incorrect for the example extra digit test of FIG. 5 is 1:1. The percentage ratio of correct to incorrect for the example wrong digit test of FIG. 6 is 1:5. Based upon these ratios and assuming that (i) the same type of results occur over multiple transactions, and (ii) data has been collected over 30 days, analyzing 100,000 transactions, totaling 1,000,000 transaction items, the table diagram illustrated in FIG. 7 can be constructed.

Referring to FIG. 7, the score for the transposed digits test is 50, the score for the extra digit test is 100, and the score for the wrong digit test is zero. Accordingly, the relative priority order of the three tests is the extra digit test first, the transposed digits test second, and the wrong digits test last. Since the score associated with the wrong digit test is zero, it is conceivable that the wrong digit test may not be performed at all.

As another example with reference to FIG. 8, assume there are two amount entry operators, Jane and John, each of whom has a different "operator profile" in that each is more prone to making certain types of errors. Assume also that Jane makes a lot more transposed digit errors than extra digit errors, and that John is the opposite. Also, as before, assume that data has been collected over 30 days, analyzing 100,000 transactions, totaling 1,000,000 items (500,000 items keyed in by each operator). It should be noted from the table in FIG. 8 that the suspect tests are prioritized differently for work keyed in by the two different amount entry operators. The prioritization of tests for work keyed in by each amount entry operator is based upon an analysis of their individual keying errors. As shown in the table of FIG. 8, the transposed digits test is prioritized first for Jane's work, and the extra digit test is prioritized first for John's work.

It should be apparent that the type of analysis just described hereinabove can be extended to include a number of other factors such as size of transaction, day of month, day of week, day of the year, etc. It should also be apparent that all of the available suspect tests in all of the categories should be analyzed in the same way as the above-described three tests (the transposed digits test, the extra digit test, and the wrong digit test). For simplicity, only the above three tests and the example analysis thereof were described in detail. It should also be apparent that the type of analysis just described hereinabove provides the capability to present correct suspect items sooner to reduce costs of operating the check processing system.

Figure 9A:
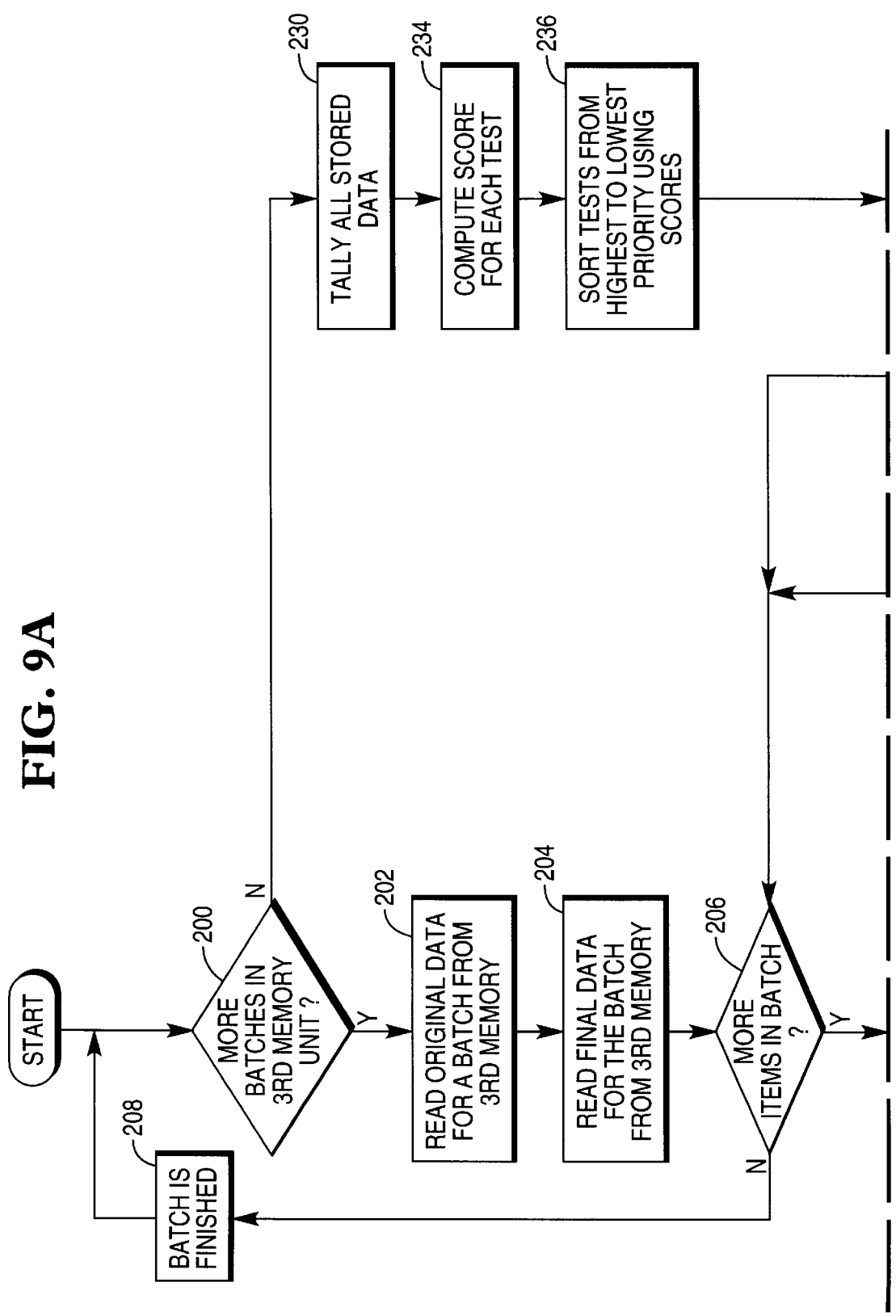
FIGS. 9 and 10 are flowcharts depicting processes carried out in accordance with the present invention.
Figure 9B:
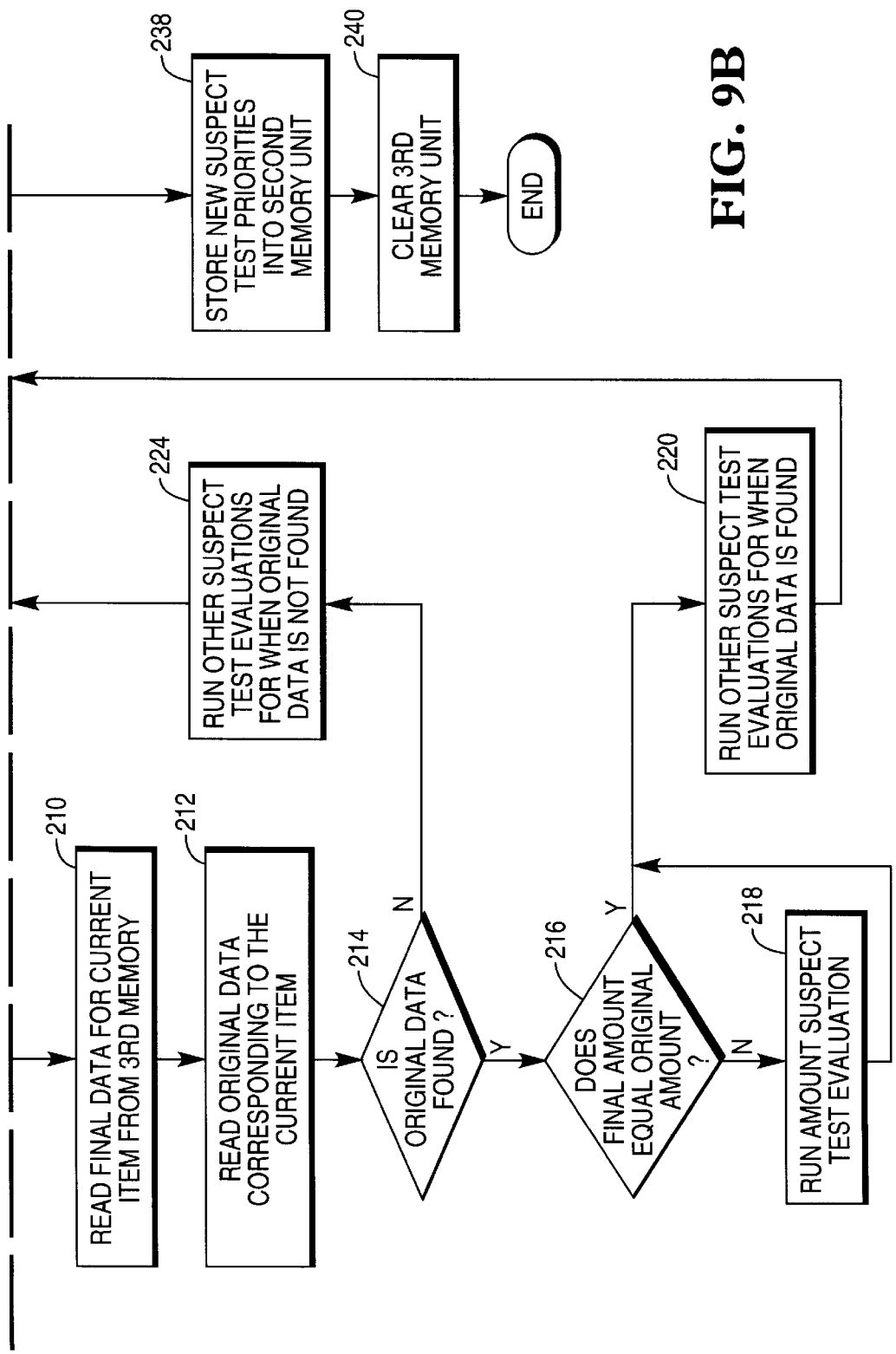

A flow chart is illustrated in FIG. 9 which depicts the learning algorithm for prioritizing suspect tests. Preferably, a dedicated processor unit 90 (shown in FIG. 1 only) is provided to carry out the steps of the learning algorithm of FIG. 9. The processor unit 90 communicates with the second memory unit 32 and the third memory unit 33. In step 200 of the learning algorithm shown in FIG. 9, a determination is made as to whether there is a batch of transactions stored in the third memory 33. If the determination in step is affirmative, the program proceeds to step 202 in which original data for the batch of transactions is read from the third memory 33. Also, final data for the batch of transactions is also read from the third memory 33, as shown in step 204.

After the original data and the final data for a batch of transactions are read, the program proceeds to step 206 in which a determination is made as to whether there are more transaction items in the batch. If the determination in step 206 is negative, the processing of the batch of transactions is completed, as shown in step 208, and the program returns to the start. If the determination in step 206 is affirmative, the program proceeds to step 210 in which the final data for a transaction item is read from the third memory 33. Also, the original data corresponding to the same transaction item is read from the third memory 33, as shown in step 212. A determination is then made in step 214 as to whether any original data was found and read in step 212. If the determination in step 214 is affirmative, the program proceeds to step 216 in which a determination is made as to whether the final amount equals the original amount. If the determination in step 216 is affirmative, the program proceeds directly to step 220. If the determination in step 216 is negative, the program proceeds to step 218 before proceeding to step 220.

Figure 10:
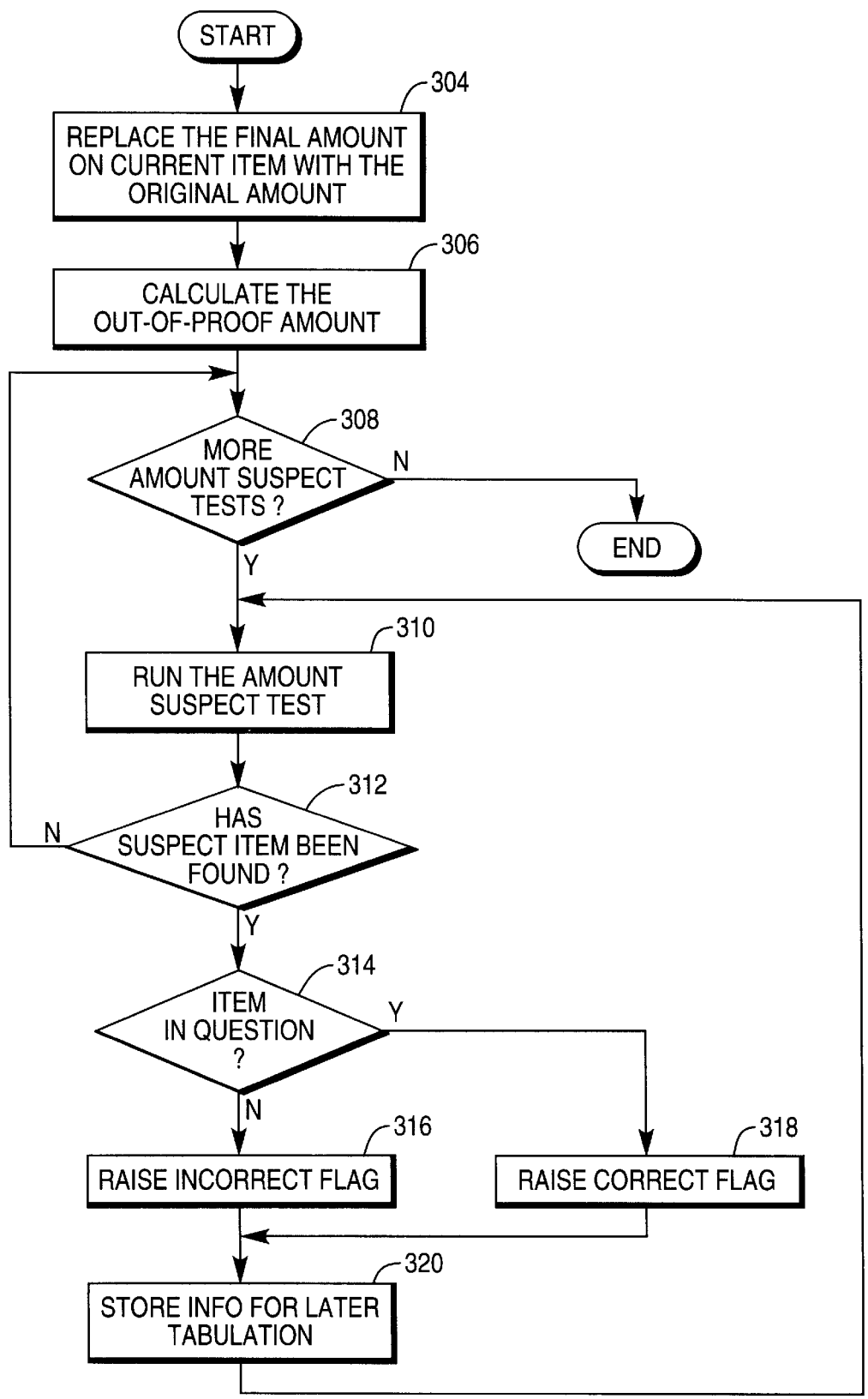

In step 218, the final data and original data of steps 210 and 212 are processed using an amount suspect test evaluation program. A flow chart of the algorithm which depicts the amount suspect test evaluation program of step 218 is illustrated in FIG. 10. As shown in step 304, the final amount of the current transaction item is replaced with the original amount. Then, as shown in step 306, the out-of-proof amount (i.e., the debit/credit difference) is calculated. The program then proceeds to step 308 in which a determination is made as to whether there are any more amount suspect tests to be applied. If the determination in step 308 is negative, the program ends. If the determination in step 308 is affirmative, the program proceeds to step 310 in which an amount suspect test is applied to the current transaction. A determination is then made in step 312 as to whether a suspect transaction item has been found. If the determination in step 312 is negative, the program returns to step 308 to obtain another amount suspect test. If the determination in step 312 is affirmative, the program proceeds to step 314.

In step 314, a determination is made as to whether the current transaction item would have been presented as a suspect item. If the determination in step 314 is negative, an "incorrect" flag is raised as shown in step 316. If the determination in step 314 is affirmative, a "correct" flag is raised as shown in step 318. After the "incorrect" or "correct" flag is raised, the program proceeds to step 320 to store information including which flag was raised for later tabulation. The program then returns to step 310.

After the amount suspect test evaluation program is run, as shown in step 218 of FIG. 9, the program proceeds to step 220. In step 220, other suspect test evaluation programs similar to the program of step 218 shown in FIG. 10 are run. Also, other suspect test evaluation programs similar to the program of step 218 are run, as shown in step 224, when the determination in step 214 is negative. From either step 220 or step 224, the program returns to step 206 to process the next transaction item in the batch. All transaction items in the batch and all batches are processed in the manner as just described hereinabove. When all batches of transaction items are processed, a negative determination is made in step 200. When the determination in step 200 is negative, the program proceeds to step 230 in which all stored data including the data of steps 220 and 224 and the information stored in step 320 of FIG. 10 are tallied. A score for each suspect test is then computed as shown in step 234.

The program then proceeds to step 236 in which the suspect tests are sorted from highest to lowest priority based upon the computed scores obtained in step 234. It is possible that certain suspect tests will be excluded from being prioritized because of a score being below a predetermined value. The "new" priorities of the suspect tests are stored into the second memory 32 as shown in step 238. The transaction item information stored in the third memory 33 is then cleared as shown in step 240.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. An image-based financial document processing system for processing transaction items including debit items and credit items, the image-based financial document processing system comprising:
   a first memory for storing data relating to transaction items which have been at least partially processed;
   a second memory for storing data relating to order of a number of suspect tests which can be applied to out-of-proof transaction items from the first memory;
   a third memory for storing data relating to at least one characteristic data collected over a previous time period;
   a balancing workstation for (i) displaying suspect tests in an order based upon data stored in the second memory to assist an operator to balance out-of-proof transaction items from the first memory, and (ii) storing data relating to at least one characteristic data collected over a previous time period in the third memory during operation of the balancing workstation; and
   a processing unit for (i) determining, without human intervention, an order of a number of suspect tests based upon data stored in the third memory, and (ii) storing the resulting order of suspect tests in the second memory.

2. An image-based financial document processing system according to claim 1, wherein the processing unit includes means for (i) analyzing, without human intervention, data stored in the third memory to determine the best order of suspect tests, and (ii) storing the resulting best order in the second memory.

3. An image-based financial document processing system according to claim 1, wherein the processing unit includes means for analyzing, without human intervention, the at least one characteristic data to determine the number of times that each suspect test would have been correctly applied to transaction items keyed in by the particular operator during the previous time period.

4. An image-based financial document processing system according to claim 1, wherein the processing unit includes means for analyzing, without human intervention, the at least one characteristic data to determine the number of times that each suspect test would have been incorrectly applied to transaction items keyed in by the particular operator during the previous time period.

5. An image-based financial document processing system according to claim 1, wherein the processing unit includes means for (i) computing, without human intervention, a score for each suspect test based upon data stored in the third memory, and (ii) prioritizing, without human intervention, the suspect tests in an order based upon the computed scores.

6. An image-based financial document processing system according to claim 5, wherein the at least one characteristic data depends upon a characteristic factor associated with the particular operator such that the computed score depends upon the characteristic factor.

7. An image-based financial document processing system according to claim 5, wherein the at least one characteristic data depends upon a factor other than associated with the particular operator such that the computed score depends upon the factor.

8. An image-based financial document processing system according to claim 7, wherein the factor other than associated with the particular operator comprises the day of the week.

9. An image-based financial document processing system according to claim 7, wherein the factor other than associated with the particular operator comprises the day of the month.

10. An image-based financial document processing system according to claim 7, wherein the factor other than associated with the particular operator comprises the size of the transaction.

11. A method of operating an image-based financial document processing system having a balancing workstation, the method comprising the steps of:

(a) storing in a first memory data relating to transaction items which have been at least partially processed;

(b) storing in a second memory data relating to order of a number of suspect tests which can be applied to out-of-proof transaction items from the first memory;

(c) storing in a third memory data relating to at least one characteristic data collected over a previous time period;

(d) displaying suspect tests in an order based upon data stored in the second memory to assist an operator at the balancing workstation to balance out-of-proof transaction items from the first memory;

(e) storing data relating to at least one characteristic data collected over a previous time period in the third memory during operation of the balancing workstation;

(f) determining, without human intervention, an order of a number of suspect tests based upon data stored in the third memory; and (g) storing the resulting order of suspect tests determined in step (d) in the second memory.

12. A method according to claim 11, wherein step (f) includes the step of:

(f-1) analyzing, without human intervention, the at least one characteristic data to determine the number of times that each suspect test would have been correctly applied to transaction items keyed in by the particular operator during the previous time period.

13. A method according to claim 11, wherein step (f) includes the step of:

(f-1) analyzing, without human intervention, the at least one characteristic data to determine the number of times that each suspect test would have been incorrectly applied to transaction items keyed in by the particular operator during the previous time period.

14. A method according to claim 11, wherein step (f) includes the steps of:

(f-1) computing, without human intervention, a score for each suspect test based upon data stored in the third memory; and (f-2) prioritizing, without human intervention, the suspect tests in an order based upon the computed scores in step (f-1).

15. A method according to claim 14, wherein the at least one characteristic data depends upon a characteristic factor associated with the particular operator such that the computed score of step (f-1) depends upon the characteristic factor.

16. A method according to claim 14, wherein the at least one characteristic data depends upon a factor other than associated with the particular operator such that the computed score of step (f-1) depends upon the factor.

17. A method according to claim 16, wherein the factor other than associated with the particular operator comprises the day of the week.

18. A method according to claim 16, wherein the factor other than associated with the particular operator comprises the day of the month.

19. A method according to claim 16, wherein the factor other than associated with the particular operator comprises the size of the transaction.

* * * * *